(12) United States Patent
Niblett et al.

(10) Patent No.: US 7,850,055 B2
(45) Date of Patent: Dec. 14, 2010

(54) ASSEMBLY HAVING GASKET RESISTANT TO SIDE LOADING BY PRESSURIZED FLUID

(75) Inventors: James R. Niblett, Columbia, MD (US); Todd A. Hagan, Windsor, PA (US)

(73) Assignee: Black & Decker Inc., Newark, DE (US)

( * ) Notice: Subject to any disclaimer, the term of this patent is extended or adjusted under 35 U.S.C. 154(b) by 247 days.

(21) Appl. No.: 11/686,691

(22) Filed: Mar. 15, 2007

(65) Prior Publication Data
US 2008/0224421 A1 Sep. 18, 2008

(51) Int. Cl.
*B25C 1/04* (2006.01)
(52) U.S. Cl. .......................... 227/156; 227/8; 227/130; 227/590
(58) Field of Classification Search .................. 227/156, 227/8, 130; 173/162.1; 277/910, 916, 925, 277/593, 598, 590
See application file for complete search history.

(56) References Cited

U.S. PATENT DOCUMENTS

| | | | |
|---|---|---|---|
| 2,462,762 A | 2/1949 | Nardin | |
| 2,867,464 A | 1/1959 | Ramsing | |
| 4,377,204 A | 3/1983 | Johansson | |
| 4,525,904 A | 7/1985 | Petri | |
| 4,635,715 A | 1/1987 | Andersson | |
| 4,995,455 A | 2/1991 | Mathur | |
| 5,333,884 A | 8/1994 | Miyaoh et al. | |
| 5,525,226 A | 6/1996 | Brown et al. | |
| 5,671,927 A | 9/1997 | Schweiger | |
| 5,793,566 A | 8/1998 | Scura | |
| 6,231,050 B1 | 5/2001 | Raden | |
| 6,886,731 B1 * | 5/2005 | Chang | 227/130 |
| 7,168,971 B2 | 1/2007 | Manson et al. | |
| 2005/0001007 A1 * | 1/2005 | Butzen et al. | 227/130 |

* cited by examiner

*Primary Examiner*—Rinaldi I. Rada
*Assistant Examiner*—Michelle Lopez
(74) *Attorney, Agent, or Firm*—Harness, Dickey & Pierce, P.L.C.

(57) ABSTRACT

An assembly that includes first and second housing members, a gasket and a plurality of bolts that exert a clamp force to clamp the gasket between the first and second housing members. The gasket includes a plurality of tab members that engage the interior of one or both of the first and second housing members. The gasket tabs can resist a force exerted by a pressurized fluid within one or both of the first and second housing members. A method for assembling and operating an article is also provided.

16 Claims, 4 Drawing Sheets

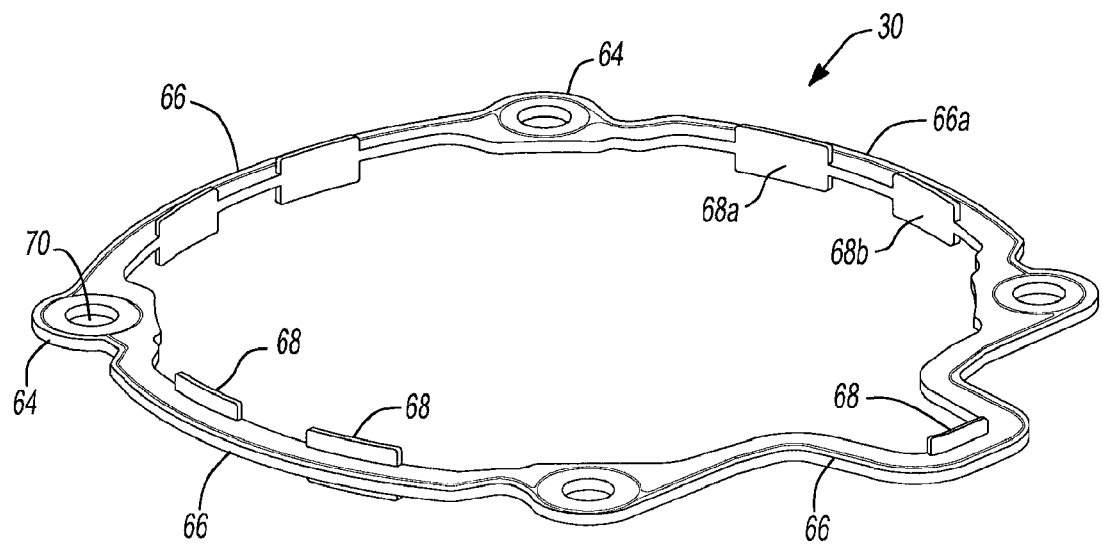
*Fig-4*
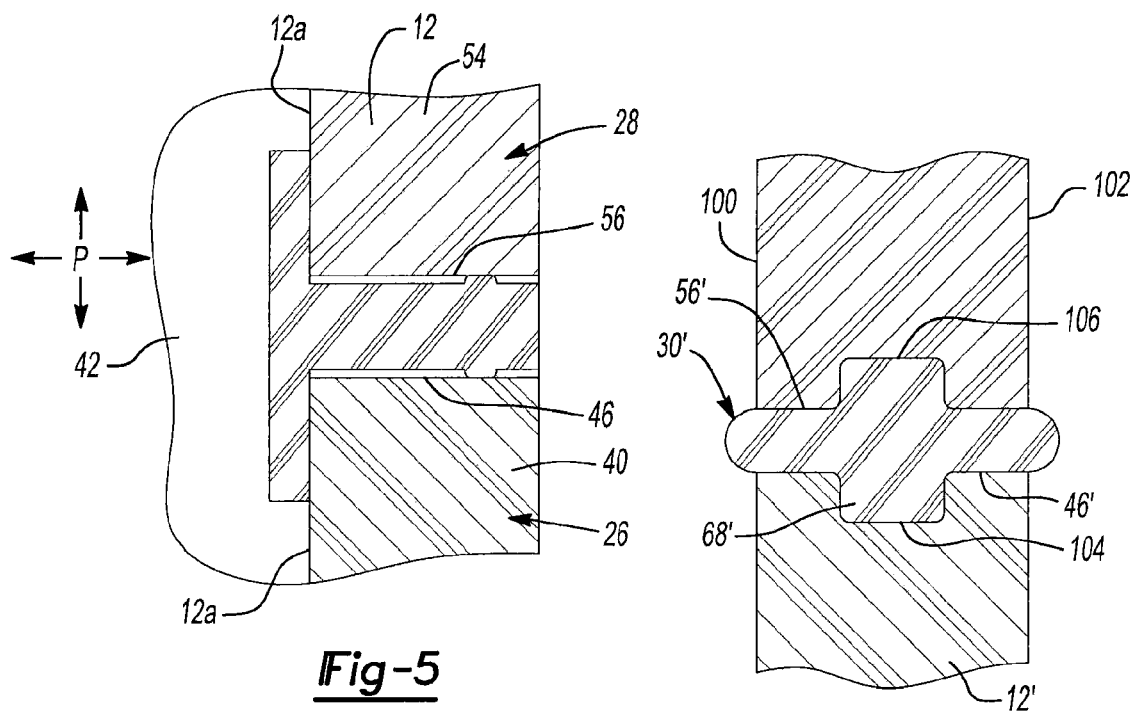
*Fig-5*
*Fig-6*

ASSEMBLY HAVING GASKET RESISTANT TO SIDE LOADING BY PRESSURIZED FLUID

INTRODUCTION

The present invention generally relates to assemblies having a pressurized fluid disposed therein and more particularly to an assembly having a gasket that is resistant to side loading by the pressurized fluid.

It is common for pneumatic fastening tools (e.g., nailers) to employ a housing that includes a housing body and an housing cap. The housing body typically includes a relatively large opening through which the components of the motor of the pneumatic fastening tool (e.g., cylinder, piston) may be installed into the housing body. The housing cap can be employed to close this opening in the housing body. A gasket is typically disposed between the surfaces of the housing body and the housing cap and a plurality of bolts are employed to fixedly but removably couple the housing cap to the housing body.

It will be appreciated that each of the bolts is elastically elongated when tightened to thereby generate a clamping force that is applied through the housing cap, the gasket and the housing body (i.e., the joint). In practice, a majority of the clamping force generated by each bolt is transmitted through the joint in the area immediately adjacent to the bolt. Consequently, the amount of clamping force that is transmitted through the joint at a given point can be inversely related to the distance between the given point and the nearest bolt.

It may be possible in some situations that fluid pressure exerted on the side of the gasket when the fastening tool is operated cause portions of the gasket to move laterally outward relative to the housing body and/or housing cap. For example, if the surfaces of the housing body and housing cap are relatively flat and smooth, the gasket is disposed laterally outwardly of the inward faces of the housing body and the housing cap at a location that is relatively far from a bolt and a lubricant is disposed on one or both sides of the gasket at this location, the clamping force applied to the gasket at this point may not be sufficient to inhibit outward movement of the gasket at this point when a pressurized fluid is disposed within the housing. In some cases, it may be possible for the gasket to move by a distance that is sufficient to permit the pressurized fluid to leak from the housing.

Accordingly, there is a need in the art for an improved assembly having a gasket that is resistant to side loading by the pressurized fluid.

SUMMARY

In one form, the present teachings provide an assembly that includes first and second housing members, a gasket and a plurality of bolts. Each of the housing members includes a wall member that defines a flange member and a plurality of bosses. The gasket is received between the housing members and includes a plurality of gasket bosses, at least one gasket segment, and a plurality of gasket tabs. The gasket bosses are disposed in-line between the bosses of the housing members. The gasket segment is disposed in-line between the flange members of the housing members and the gasket tabs are generally transverse to the gasket segment. The bolts are received through the bosses of the housing members and the gasket bosses and apply a clamp force to the first housing member, the gasket and the second housing member. The gasket tabs abut the wall member of at least one of the first and second housing members and are configured to resist an outwardly directed force that is applied to an edge of the gasket by a pressurized fluid disposed in at least one of the first housing member and the second housing member.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a perspective view of the gasket;

FIG. 5 is a section view taken through a portion of the tool of FIG. 1 along the line 5-5 of FIG. 2 and illustrates the gasket disposed between the housing body and the housing cap and the tab member engaging the interior of the housing assembly; and FIG. 6 is a section view similar to that of FIG. 5 but illustrating another example of an assembly constructed in accordance with the teachings of the present disclosure wherein the tab members are positioned between the lateral edges of an associated gasket segment.

DETAILED DESCRIPTION OF THE VARIOUS EMBODIMENTS

Figure 1:
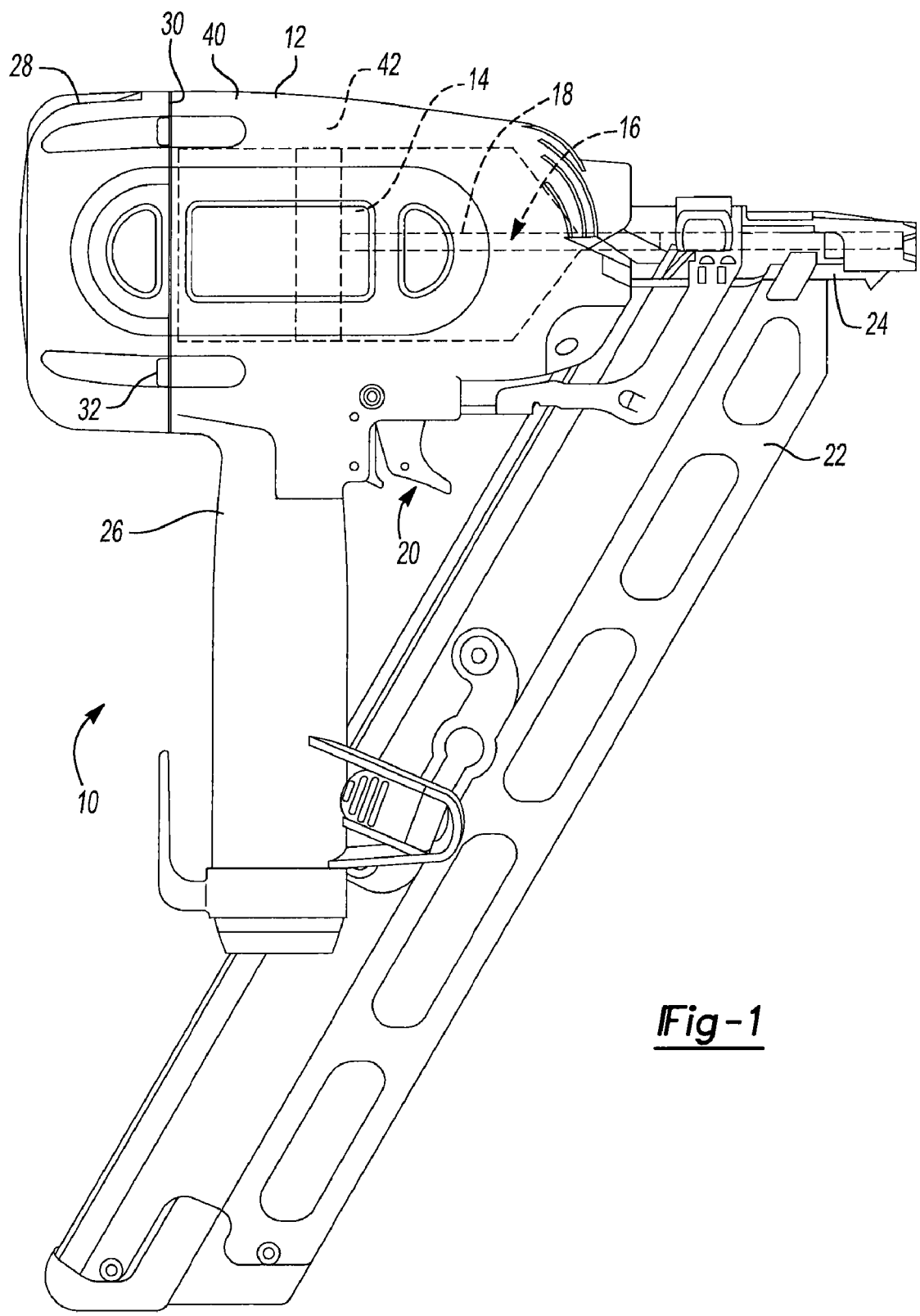
FIG. 1 is a right side view of a tool constructed in accordance with the teachings of the present invention.

With reference to FIG. 1 of the drawings, a pneumatic tool constructed in accordance with the teachings of the present disclosure is generally indicated by reference numeral 10. The pneumatic tool 10 can include a housing assembly 12, a pneumatic motor assembly 14, an output member 16 such as a driver 18, a trigger assembly 20 and a magazine assembly 22. In the particular embodiment illustrated, the pneumatic tool 10 is a nailer, but it will be appreciated that the teachings of the present disclosure have applicability to other types of hand-held pneumatic tools, including those having a rotary, axial, reciprocating, oscillating and/or orbital output. The motor assembly 14, the output member 16, the driver 18, the trigger assembly 20, the magazine assembly 22 and the nosepiece 24 can be conventional in their construction and operation and need not be discussed in particular detail. For example, the motor assembly 14, the output member 16, the driver 18, the trigger assembly 20, the magazine assembly 22 and the nosepiece 24 can be constructed as described and illustrated in U.S. Pat. No. 6,648,202 entitled "Pneumatic Fastening Tool", the disclosure of which is hereby incorporated by reference as if set forth in its entirety herein. Briefly, the housing assembly 12 can include a nosepiece 24 into which the driver 18 can be received. The motor assembly 14 can be disposed in the housing and can be coupled to the driver 18. The motor assembly 14 can be operable for translating the driver 18 in a driving direction. The trigger 20 can be coupled to the housing assembly 12 and can be operable for selectively activating the motor assembly 14 to translate the driver 18. The magazine assembly 22 can be coupled to the housing assembly 12 and can be configured to store a plurality of fasteners, e.g., nails (not shown) and sequentially feed the fasteners into the nosepiece 18.

The housing assembly 12 can include a housing body 26, a housing cap 28, a gasket 30 and a plurality of bolts (e.g., socket head cap screws) 32. With additional reference to FIG. 2, the housing body 26 can include a wall member 40 that can define a cavity 42 having an opening 44 through which the motor assembly 14 can be received. The wall member 40 can include a first flange member 46 and a plurality of first bosses 48. The first flange member 46 can be generally flat. The first bosses 48 can be arranged about the perimeter of the opening 44 generally perpendicular to the first flange member 46. In the example provided, the first bosses 48 extend through the first flange member 46 and include a threaded portion 50 that is configured to threadably engage the bolts 32.

Figure 2:
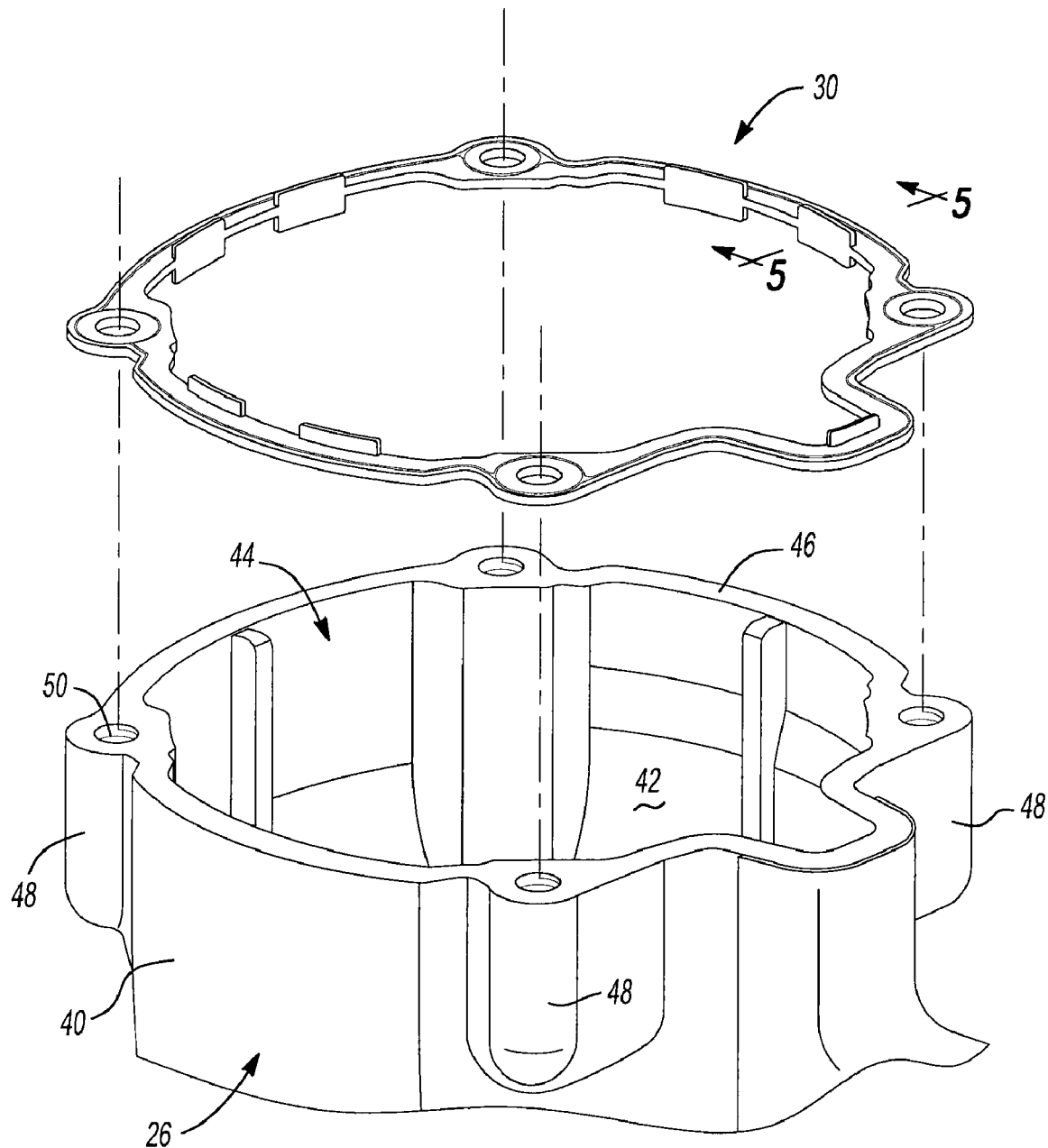
FIG. 2 is an exploded perspective view of a portion of the tool of FIG. 1 illustrating the gasket exploded from the housing body.
Figure 3:
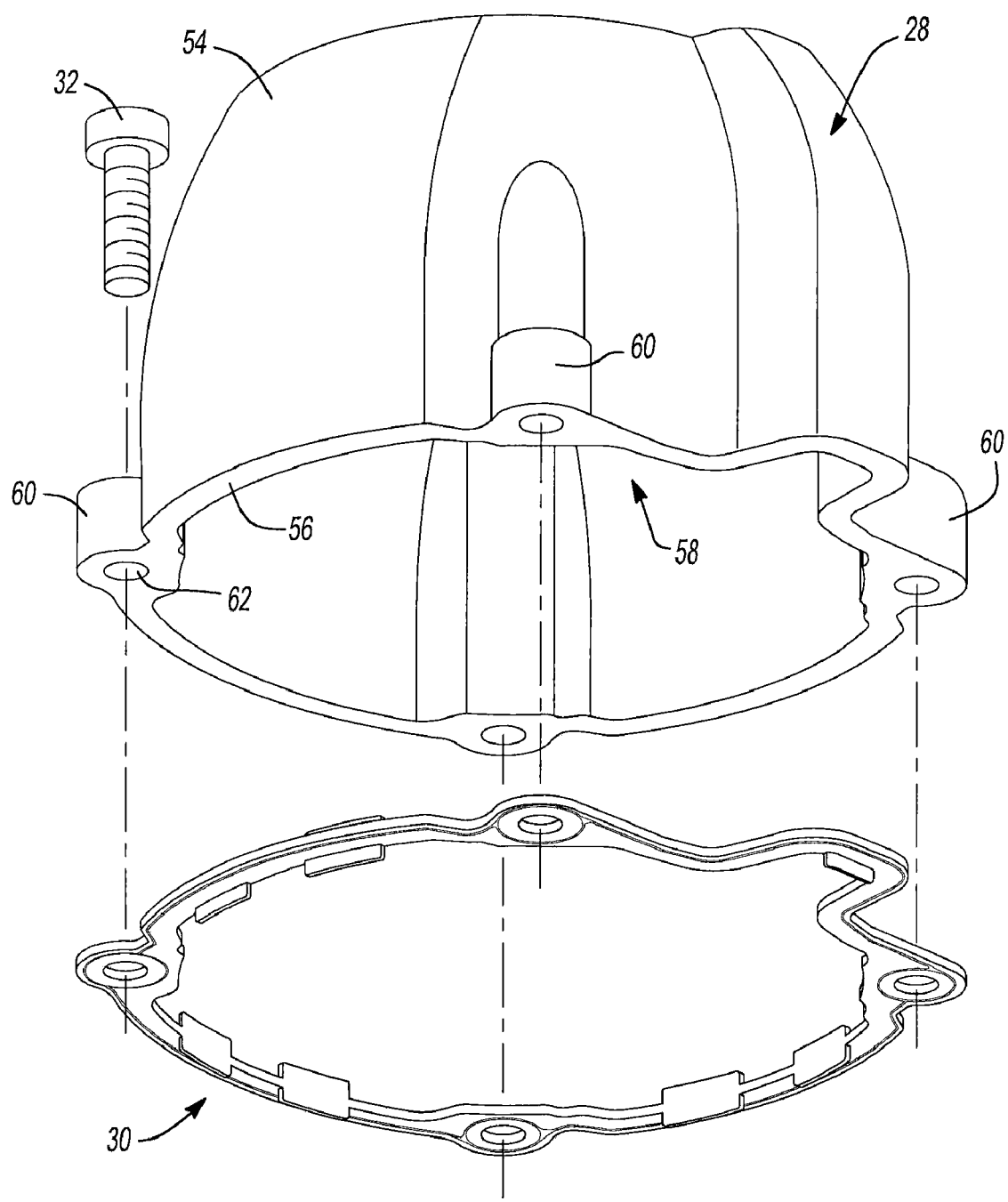
FIG. 3 is an exploded view of a portion of the tool of FIG. 1 illustrating the gasket exploded from the housing cap.

With reference to FIGS. 2 and 3, the housing cap 28 is configured to close the opening 44 in the housing body 26 and can include a cap wall 54. The cap wall 54 can terminate at a second flange member 56 and can define a recess 58 and a plurality of second bosses 60. The second flange member 56 can be generally flat. The second bosses 60 can be arranged generally perpendicular to the second flange member 56. Each second boss 60 can include a through-bore 62 that is configured to receive an associated one of the bolts 32 there through. It will be appreciated that the second bosses 60 are disposed in-line with the first bosses 48 when the housing cap 28 is coupled to the housing body 26 as shown in FIG. 1.

With reference to FIGS. 2 through 5, the gasket 30 can be formed of an appropriate gasket material, such as a thermoplastic elastomer, and can include a plurality of gasket bosses 64, a plurality of gasket segments 66 and a plurality of gasket tabs 68. The gasket bosses 64 can be configured to abut the first and second bosses 48 and 60 and can include a through hole 70 through which an associated one of the bolts 32 (FIG. 1) can be received. Each gasket segment 66 can be coupled to two or more of the gasket bosses 64 and can abut portions of the first and second flange members 46 and 56 between associated pairs of first bosses 48 and pair of second bosses 60. The gasket tabs 68 can be coupled to the gasket segments 66 at one or more locations intermediate the pairs of first bosses 48 (FIG. 2) and the pairs of second bosses 60 (FIG. 3). Each gasket tab 68 can extend generally transverse to an associated one of the gasket segments 66 and can abut the wall member 40 of the housing body 26 and/or the cap wall 54 of the housing cap 28. In the particular example provided, the tab members 68 frictionally engage the wall member 40 and the cap wall 54 to help align and retain the gasket 30 to the housing body 26 and the housing cap 28, respectively. It will be understood, however, that the tab members 68 can be spaced somewhat inward of the wall member 40 and the cap wall 54 in the alternative so that a relatively small space is disposed between the outward face of the tab members 68 and the interior surface 12a (FIG. 5) of the housing assembly 12 (FIG. 5). In such situation, the fluid pressure within the housing assembly 12 (FIG. 5) can be sufficient to urge the tab members 68 into abutment against the wall member 40 and/or the cap wall 54. Accordingly, those of skill in the art will appreciate from this disclosure that the tab members 68 can be shaped in any desired manner that is different than the gasket segment 66 to which it is attached and can abut one or both of the wall member 40 and the cap wall 54 to limit outward movement of the gasket 30. For example, the tab members 68 could be wedge-shaped or could have a cross-section that is thicker (in the direction of the joint) than the thickness of the gasket segment 66.

Each of the gasket tabs 68 may be located along an associated one of the gasket segments 66 equidistant from associated pairs of the first and second bosses 48 and 60. Alternatively, a plurality of gasket tabs 68 may be located along a given gasket segment 66 such that the gasket tabs 68 are proximate one or more regions where the clamp force transmitted through the joint (i.e., the first flange member 46, the gasket 30 and the second flange member 56) is relatively low. In the particular example provided, two gasket tabs 68a and 68b are coupled to the gasket segment 66a and the gasket tabs 68a and 68b are disposed symmetrically about a mid-point of the gasket segment 66a (i.e., at a point along the length of the gasket segment 66a at which the magnitude of the clamp force transmitted across the joint is smallest).

The bolts 32 can be received through the second bosses 60 and the gasket bosses 64 and can be threadably engaged to the first bosses 48 to generate a clamp force that may be transmitted through the joint.

In operation, a pressurized fluid such as compressed air can be received in the cavity 42. The pressurized fluid can exert a force onto the housing assembly 12 that can tend to separate the housing body 26 from the housing cap 28. The clamp force generated by the bolts 32 can counteract the separating force of the pressurized fluid and can maintain the first and second flange members 46 and 56 in sealing engagement with the gasket 30. The pressurized fluid can also exert a lateral force on the gasket 30 that can tend to push the gasket 30 outwardly from between the housing body 26 and the housing cap 28. The gasket tabs 68, which can abut one or both of the wall member 40 and the cap wall 54, can be urged outwardly against the interior surface 12a of the housing assembly 12 by the pressurized fluid. The gasket tabs 68 can resist or inhibit outward lateral movement of the gasket relative to the housing assembly 12.

It will be appreciated that while the gasket 30 has been illustrated and described as being formed of a thermoplastic elastomer, those of skill in the art will appreciate that the invention, in its broadest aspects, may be constructed somewhat differently. For example, the gasket 30 may be formed such that the gasket tabs 68 are first cut (e.g., punched) and thereafter bent or folded into an orientation that is transverse to an associated gasket segment 66. It will be appreciated from this disclosure that the gasket tabs 68 may all be bent or folded in a single direction or that a first portion of the gasket tabs 68 may be bent or folded in a first direction and that a second portion of the gasket tabs 68 may be bent or folded in a second direction opposite the first direction.

While the gasket 30 has been illustrated and described as including one or more tab members 68 that are coupled to an inward side of an associated gasket segment, those of skill in the art will appreciate that the invention, in its broadest aspects, may be constructed somewhat differently. For example, the gasket 30' can be formed such that the tab member 68' can be disposed laterally between the interior and exterior surfaces 100 and 102, respectively of the housing assembly 12' as shown in FIG. 6. In the example illustrated, recesses 104 and 106, respectively, can be formed in the first and second flange members 46' and 56', respectively. It will be appreciated that the recesses 104 could be spaced apart along the first flange member 46' and that the recesses 106 could be spaced apart along the second flange member 56' (i.e., the recesses are spaced apart and are discrete pockets formed into an associated flange member). It will also be appreciated that a single, continuous recess could be employed in one or both of the first and second flange members 46' and 56'. It will be further appreciated that regardless of the configuration of the recesses, the quantity of tab members 68' may be greater than or less than the quantity of recesses and that one of the recesses 104 or 106 could be omitted altogether (i.e., the gasket would have a T-shaped cross-section as taken through a gasket segment and a gasket tab).

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An assembly comprising:
a housing assembly having a housing and a nosepiece;
a driver received in the nosepiece;
a motor assembly disposed in the housing assembly, the motor assembly being coupled to the driver and being operable for translating the driver in a driving direction;
a trigger coupled to the housing assembly and operable for selectively activating the motor assembly to translate the driver; and
a magazine assembly coupled to the housing assembly, the magazine assembly being adapted to store a plurality of fasteners and sequentially feed the fasteners into the nosepiece;
wherein the housing includes a first housing member, a second housing member and a gasket, the first housing member including a first inner surface, a first outer surface, and a first end face, wherein the first inner surface at least partly defines a first cavity, and wherein the first end face extends between the first inner surface and the first outer surface, the second housing member including a second inner surface, a second outer surface, and a second end face, wherein the second inner surface at least partly defines a second cavity, and wherein the second end face extends between the second inner surface and the second outer surface, the gasket being received axially between the first and second housing members and sealingly engaging the first and second end faces, the gasket including a plurality of gasket bosses and including at least one projecting portion that is located between two consecutive ones of the plurality of gasket bosses, wherein the at least one projecting portion extends into the first and second cavities, wherein the at least one projecting portion contacts the first and second inner surfaces, and wherein the at least one projecting portion is configured to limit laterally outward movement of the gasket between the first and second end faces relative to the first and second housing members; and
wherein the at least one projecting portion is preformed prior to compression of the gasket between the first and second housing members.

2. The assembly of claim 1, wherein the gasket is at least partially formed of an elastomer.

3. The assembly of claim 2, wherein the elastomer is a thermoplastic elastomer.

4. The assembly of claim 1, wherein the housing further comprises a plurality of bolts that apply a clamp force to the first housing member, the gasket and the second housing member.

5. The assembly of claim 4, wherein the at least one projection is disposed in a region in which a magnitude of the clamp force transmitted through the first housing member, the gasket and the second housing member is relatively lower than surrounding regions.

6. The assembly of claim 1 wherein the at least one projecting portion extends perpendicular to the first and second end faces.

7. An assembly comprising:
a housing assembly having a housing and a nosepiece;
a driver received in the nosepiece;
a motor assembly disposed in the housing assembly, the motor assembly being coupled to the driver and being operable for translating the driver in a driving direction;
a trigger coupled to the housing assembly and operable for selectively activating the motor assembly to translate the driver; and
a magazine assembly coupled to the housing assembly, the magazine assembly being adapted to store a plurality of fasteners and sequentially feed the fasteners into the nosepiece;
wherein the housing includes a first housing member, a second housing member and a gasket, the first housing member including a first inner surface, a first outer surface, and a first end face, wherein the first inner surface at least partly defines a first cavity, and wherein the first end face is disposed between the first inner surface and the first outer surface, the second housing member including a second inner surface, a second outer surface, and a second end face, wherein the second inner surface at least partly defines a second cavity, and wherein the second end face is disposed between the second inner surface and the second outer surface, the gasket being received axially between the first and second housing members and sealingly engaging the first and second end faces, the at least one projecting portion being configured to limit outward movement of the gasket between the first and second end faces relative to the first and second housing members;
wherein each of the at least one projecting portions is received into a corresponding recess that is formed in the midst of first end face, the second end face or both the first and second end faces, and
wherein the at least one projecting portion is preformed prior to compression of the gasket between the first and second housing members.

8. The assembly of claim 7, wherein the gasket is at least partially formed of an elastomer.

9. The assembly of claim 8, wherein the elastomer is a thermoplastic elastomer.

10. The assembly of claim 7, wherein the housing further comprises a plurality of bolts that apply a clamp force to the first housing member, the gasket and the second housing member.

11. The assembly of claim 10, wherein the at least one projection is disposed in a region in which a magnitude of the clamp force transmitted through the first housing member, the gasket and the second housing member is relatively lower than surrounding regions.

12. The assembly of claim 7, wherein each corresponding recess is disposed in the middle of the first end face, the middle of the second end face or in the middle of the first end face and the middle of the second end face.

13. An assembly comprising:
- a housing assembly having a housing and a nosepiece;
- a driver received in the nosepiece;
- a motor assembly disposed in the housing assembly, the motor assembly being coupled to the driver and being operable for translating the driver in a driving direction;
- a trigger coupled to the housing assembly and operable for selectively activating the motor assembly to translate the driver; and
- a magazine assembly coupled to the housing assembly, the magazine assembly being adapted to store a plurality of fasteners and sequentially feed the fasteners into the nosepiece;
- wherein the housing includes a first housing member, a second housing member and a gasket, the first housing member including a first inner surface, a first outer surface, and a first end face, wherein the first inner surface defines a first cavity, and wherein the first inner and outer surfaces define the first end face, the second housing member including a second inner surface, a second outer surface, and a second end face, wherein the second inner surface defines a second cavity, and wherein the second inner and outer surfaces define the second end face, the gasket being received axially between the first and second housing members and sealingly engaging the first and second end faces, the gasket including at least one gasket tab that extends perpendicular to the first and second end faces and into the first and second cavities, the at least one gasket tab limiting laterally outward movement of the gasket between the first and second end faces relative to the first and second housing members;
- wherein the at least one gasket tab is preformed prior to compression of the gasket between the first and second housing members.

14. The assembly of claim 13, wherein the housing further comprises a plurality of bolts that apply a clamp force to the first housing member, the gasket and the second housing member, and wherein the at least one gasket tab is located between two consecutive ones of the plurality of bolts.

15. The assembly of claim 13, wherein the gasket is at least partially formed of an elastomer.

16. The assembly of claim 15, wherein the elastomer is a thermoplastic elastomer.

* * * * *